(12) United States Patent
Wheelwright et al.

(10) Patent No.: US 11,577,681 B2
(45) Date of Patent: Feb. 14, 2023

(54) FAR-SIDE AIRBAG ASSEMBLIES WITH PILLOW AND SAIL

(71) Applicant: Autoliv ASP, Inc., Ogden, UT (US)

(72) Inventors: Terry Alan Wheelwright, Morgan, UT (US); Andrew Lawrence Holliday, Pleasant View, UT (US); Charles Paul Dinsdale, Farr West, UT (US); Derek John Wiscombe, Morgan, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/115,175

(22) Filed: Dec. 8, 2020

(65) Prior Publication Data
US 2022/0176904 A1 Jun. 9, 2022

(51) Int. Cl.
*B60R 21/207* (2006.01)
*B60R 21/231* (2011.01)
*B60R 21/00* (2006.01)

(52) U.S. Cl.
CPC ...... *B60R 21/207* (2013.01); *B60R 21/23138* (2013.01); *B60R 2021/0006* (2013.01); *B60R 2021/0009* (2013.01)

(58) Field of Classification Search
None
See application file for complete search history.

(56) References Cited

U.S. PATENT DOCUMENTS

| | | | | |
|---|---|---|---|---|
| 5,636,862 A * | 6/1997 | Cheung | ............ | B60R 21/207 280/730.2 |
| 5,730,464 A * | 3/1998 | Hill | ............ | B60R 21/23138 280/730.2 |
| 7,240,915 B2 * | 7/2007 | Peng | ............ | B60R 21/23138 280/730.2 |
| 7,549,672 B2 * | 6/2009 | Sato | ............ | B60R 21/207 280/729 |
| 9,016,718 B2 * | 4/2015 | Fukawatase | ...... | B60R 21/23138 280/730.2 |
| 9,994,181 B1 * | 6/2018 | Dubaisi | ............ | B60R 21/207 |
| 10,189,432 B2 * | 1/2019 | Matsushita | ............ | B60R 21/207 |
| 10,246,041 B2 * | 4/2019 | Kobayashi | ............ | B60R 21/237 |
| 10,336,278 B2 * | 7/2019 | Schneider | ............ | B60R 21/207 |
| 10,486,638 B2 * | 11/2019 | Kwon | ............ | B60R 21/23138 |

(Continued)

FOREIGN PATENT DOCUMENTS

| | | | | |
|---|---|---|---|---|
| DE | 102019103484 A1 * | 8/2019 | ....... | B60R 21/23138 |
| DE | 102018214536 | 3/2020 | | |

(Continued)

OTHER PUBLICATIONS

International Search Report and Written Opinion dated Feb. 9, 2022 for international application PCT/US2021/072190.

*Primary Examiner* — Faye M Fleming
(74) *Attorney, Agent, or Firm* — Foley & Lardner LLP (57) ABSTRACT

Far-side inflatable airbag assemblies are disclosed to be installed to deploy adjacent an occupant during a far-side collision event or a far-side oblique collision event, and may retain the occupant at the occupant's vehicle occupant position to protect the occupant from collision with structures within the vehicle, as well as from collisions with other occupants of the vehicle. The far-side inflatable airbag assemblies of the present disclosure may be particularly beneficial when installed between vehicle occupant positions of the vehicle.

19 Claims, 6 Drawing Sheets

(56) References Cited

U.S. PATENT DOCUMENTS

| | | | |
|---|---|---|---|
| 10,703,322 B2 * | 7/2020 | Kitagawa | B60R 21/233 |
| 10,814,824 B2 * | 10/2020 | Song | B60R 21/2338 |
| 10,960,841 B2 * | 3/2021 | Deng | B60R 21/239 |
| 2006/0119082 A1 * | 6/2006 | Peng | B60R 21/2338 |
| | | | 280/730.2 |
| 2006/0119083 A1 * | 6/2006 | Peng | B60R 21/207 |
| | | | 280/730.2 |
| 2014/0151984 A1 | 6/2014 | Fukawatase | |
| 2017/0259774 A1 * | 9/2017 | Matsushita | B60R 22/12 |
| 2019/0061675 A1 | 2/2019 | Kwon | |
| 2019/0092270 A1 | 3/2019 | Song et al. | |

FOREIGN PATENT DOCUMENTS

| | | | | |
|---|---|---|---|---|
| KR | 20120118233 A | * | 10/2012 | |
| WO | 1997006987 | | 2/1997 | |
| WO | WO-2019193082 A1 | * | 10/2019 | B60R 21/207 |

\* cited by examiner

FAR-SIDE AIRBAG ASSEMBLIES WITH PILLOW AND SAIL

TECHNICAL FIELD

The present disclosure relates generally to the field of automotive protective systems. More particularly, the present disclosure relates to airbag assemblies, such as far-side airbag assemblies that are configured to deploy in response to collision events.

BACKGROUND

Protection systems have been installed in vehicles to protect an occupant during a collision event. Some protection systems include inflatable far-side airbags. Some protection systems suffer from one or more drawbacks, or may perform less than optimally in one or more respects. Certain embodiments disclosed herein can address one or more of these issues.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not to be considered limiting of the scope of the disclosure, the embodiments will be described and explained with specificity and detail in reference to the accompanying drawings.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Occupant protection systems, such as inflatable airbag assemblies, may be installed at various locations within a vehicle to reduce or minimize occupant injury during a collision event. Inflatable airbag assemblies are widely used to reduce or minimize occupant injury during a collision event. Airbag modules have been installed at various locations within a vehicle, including, but not limited to, in the steering wheel, in the dashboard and/or instrument panel, within the side doors, within or adjacent seats, adjacent to a roof rail of the vehicle, in an overhead position, or at the knee or leg position. In the following disclosure, "airbag" generally refers to an inflatable airbag that deploys to protect an occupant during a collision event.

The present disclosure is directed to far-side airbag assemblies that are configured to deploy to protect an occupant during a far-side collision event, including an oblique far-side collision event. A far-side collision event occurs for a relevant occupant when the vehicle is impacted on a side (e.g., a lateral side) of the vehicle opposite of where the relevant occupant is disposed, such that the event produces forces that tend to push the far side of the vehicle, directly or obliquely, in the direction of the occupant. In other words, in a far-side collision event, the relevant occupant is disposed toward a side of a vehicle that is opposite the side impacted during the event. For example, an occupant of a leftward-disposed seat experiences a far-side collision when impact occurs on the right side of the vehicle. A far-side inflatable airbag assembly may be installed to be disposed between a vehicle occupant position and the far side of the vehicle, relative to the particular vehicle occupant position. The far-side inflatable airbag assembly may deploy an inflatable airbag cushion in response to a far-side collision event, and the inflatable airbag cushion may be configured to reduce or eliminate the effect of the forces of the far-side collision upon the occupant of the particular vehicle occupant position. The inflatable airbag cushion may reduce movement of the occupant toward a vehicle structure (e.g., a between-seats console, a steering wheel, etc.) or toward or into an adjacent vehicle occupant position, and may reduce the likelihood or degree of impact of the occupant with a vehicle structure or another occupant, thereby reducing or preventing injury to the occupant in a far-side collision event.

As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present.

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand.

The term "inboard," as used herein generally denotes a direction toward a longitudinal midline of a vehicle; however, the present invention anticipates embodiments wherein seating is not limited to two-across in a vehicle. In such an embodiment, "inboard" refers to a direction from one vehicle occupant position toward an adjacent vehicle occupant position. In an embodiment having a row of three or more seats abreast, each seat not disposed at an end of the row may have an "inboard" side on either or both lateral sides of vehicle occupant position, for purposes of the present disclosure. Furthermore, "inboard," in some embodiments, refers to a direction from a vehicle occupant position and toward a space or void between the vehicle occupant position and a side structure of the vehicle, such as, e.g., a cargo space adjacent a vehicle seating position.

During installation, airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from a packaged state (e.g., a compact configuration) to a deployed state or an expanded configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors. An airbag assembly can mitigate injury to an occupant of a vehicle during a collision event by reducing the effect of impact of the occupant against structures (body-structure impact) within the vehicle (such as, e.g., a dashboard or door column).

Some embodiments disclosed herein can provide improved positioning, cushioning, and/or safety to occupants involved in particular types of collisions. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap front crash test and the NHTSA oblique impact test are disclosed in the Insurance Institute for Highway Safety, Small Overlap Frontal Crashworthiness Evaluation Crash Test Protocol (Version II) (December 2012); and Saunders, J., Craig, M., and Parent, D., Moving Deformable Barrier Test Procedure for Evaluating Small Overlap/Oblique Crashes, SAE Int. J. Commer. Veh. 5(1): 172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the car-forward direction.

Figure 1:
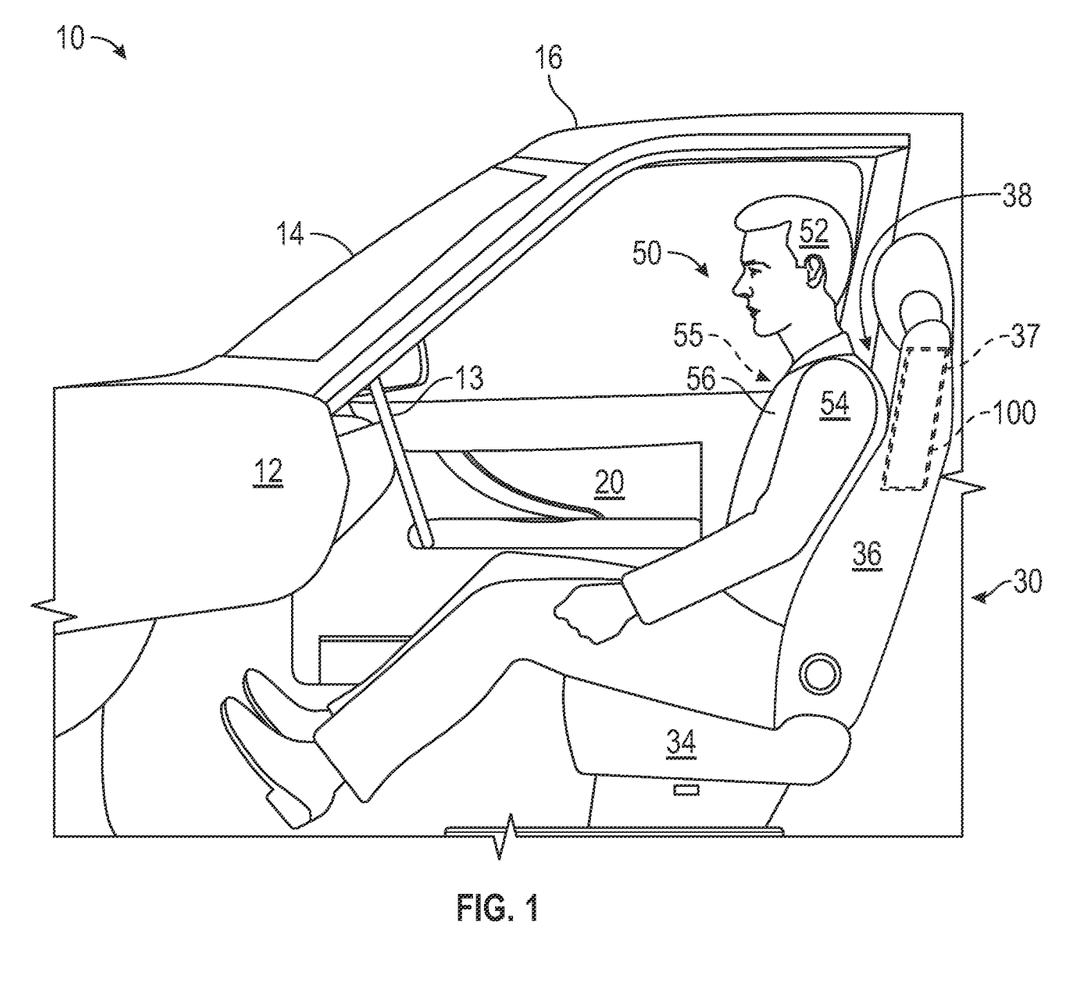
FIG. 1 is a side view of a portion of an interior of a vehicle equipped with a far-side inflatable airbag assembly according to an embodiment of the present disclosure.

FIG. 1 is a side view of a portion of an interior of a vehicle 10 equipped with a far-side inflatable airbag assembly 100 according to an embodiment of the present disclosure. A dashboard/instrument panel ("dash") 12 is shown for reference, as are a steering wheel 13, a windshield 14, a roof 16 of the vehicle 10, and a far-side door 20. The vehicle 10 includes a vehicle occupant position 30 defined by a seat 32 (e.g., a driver seat, a front passenger seat, etc.) and may be a position in which an occupant is generally positioned when seated in a seat of a vehicle. The vehicle occupant position 30 may be the position in which the vehicle 10 and/or the seat 32 is designed to transport an occupant 50 and/or a position in which an occupant 50 may be seated prior to and/or during a collision event. In the current example of an embodiment of the disclosure, the vehicle occupant position 30 is disposed toward a vehicle 10 left side, and the door 20 is on the vehicle 10 right side, and another vehicle occupant position (not shown, but in many respects similar to the vehicle occupant position 30) may be disposed between the vehicle occupant position 30 and the door 20. In a left-hand drive vehicle having two-across front seating, the illustrated vehicle occupant position 30 of the current embodiment is defined by a driver seat 32. In a right-hand drive, two-across front seating vehicle, the vehicle occupant position 30 is defined by a front passenger seat 32. The seat 32 comprises a seat base 34 and a seatback 36. The seatback 36 comprises a void 37 configured to receive and support the far-side inflatable airbag assembly 100 of the present disclosure. The void 37 may be disposed at an inboard side portion of the seatback 36 and the far-side inflatable airbag assembly 100 may be mounted at least partially within the void 37. An occupant 50 is shown seated at the vehicle occupant position 30. A head 52, a near-side shoulder 54 (relative to the viewer of FIG. 1), and a torso 56 of the occupant 50 are identified for reference. The occupant 50 also has a far-side shoulder 55. The vehicle occupant position 30 comprises a shoulder portion 38 that may be configured to accommodate a shoulder 54, 55 of an occupant 50 or may otherwise be a position where a shoulder of an occupant 50 may be positioned within the vehicle occupant position 30.

Although a steering wheel 13 is shown, the occupant 50 may be a driver or a passenger occupant of the vehicle 10. In a typical embodiment of the present disclosure, an additional vehicle occupant position is disposed between the vehicle occupant position 30 and the door 20. The far-side inflatable airbag assembly 100 is disposed within the void 37, and the void 37 is disposed in a portion of the seatback 36 (e.g. a side portion) toward the door 20. In one embodiment, the void 37 may be disposed in a side portion of the seatback 36 disposed toward a longitudinal centerline of the vehicle and a distance from a laterally adjacent seat or vehicle occupant position of the vehicle to limit inboard lateral displacement of at least a portion of an occupant of the vehicle occupant position during a far-side collision event.

Figure 2A:
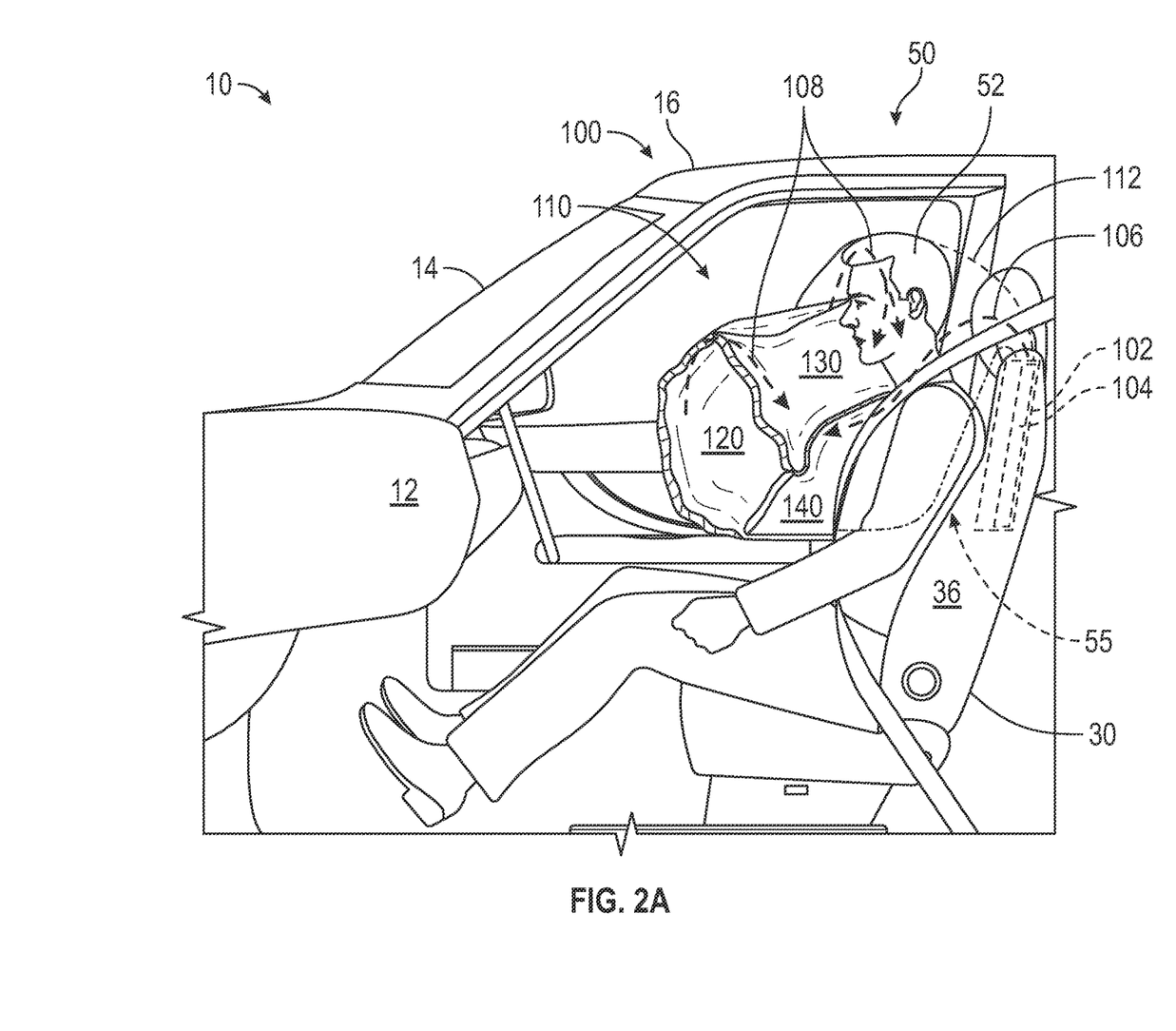
FIG. 2A is a side view of a portion of the vehicle having the far-side inflatable airbag assembly of FIG. 1, with the far-side inflatable airbag assembly partially deployed.
Figure 2B:
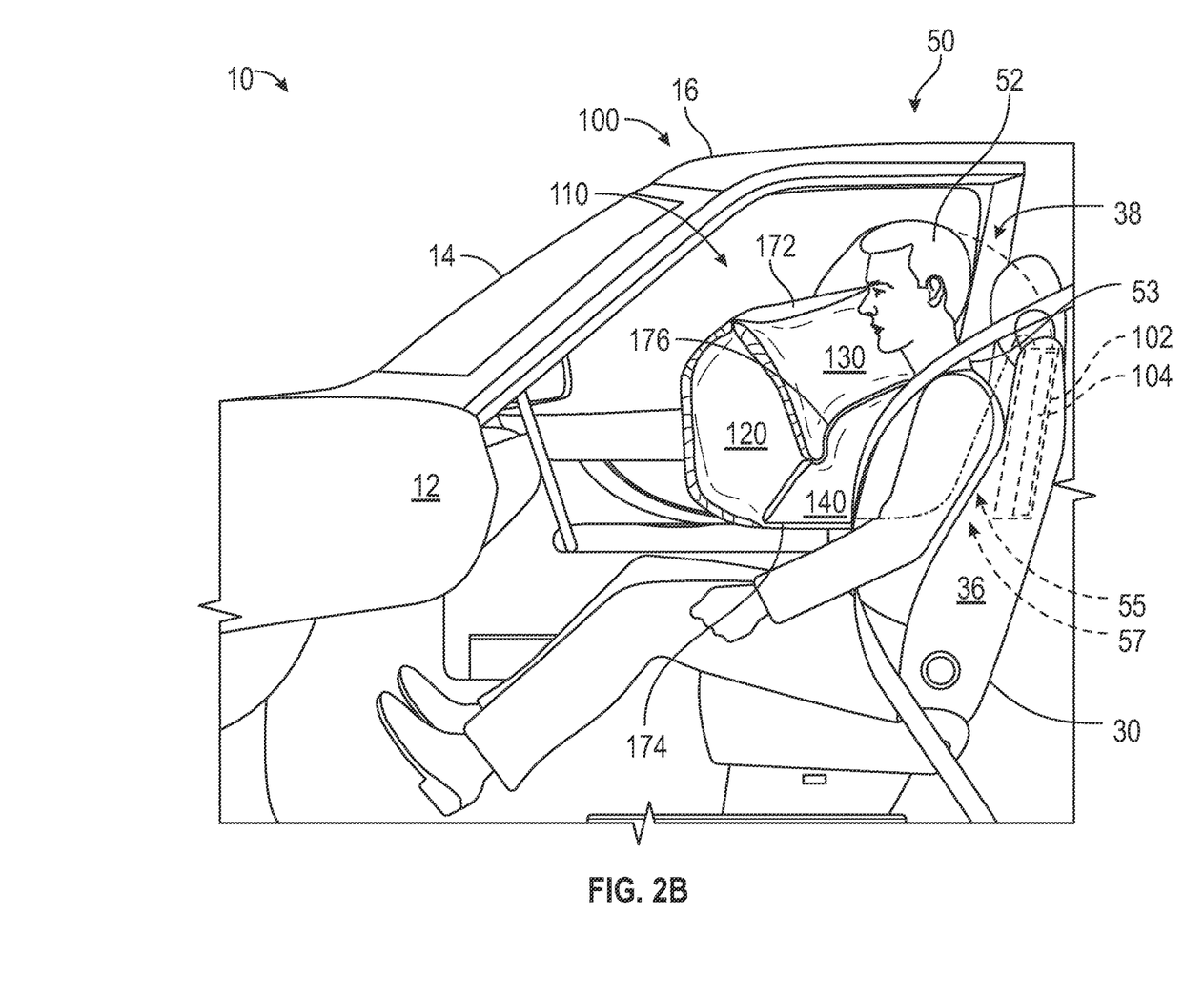
FIG. 2B is a side view of a portion of the interior of the vehicle having the far-side inflatable airbag assembly of FIGS. 1 and 2A, with the inflatable airbag cushion in a substantially inflated state, according to an embodiment of the present disclosure.

In one embodiment, the far-side inflatable airbag assembly 100 may be a unitized airbag module comprising a housing, an inflator, and an inflatable airbag cushion in a packaged state (see the housing 102, the inflator 104, the inflatable airbag cushion 110 in FIGS. 2A, 2B). In one embodiment, the far-side inflatable airbag assembly 100 may comprise individual components, such as the housing 102, the inflator 104, the inflatable airbag cushion 110 in a packaged state, which may be individually installed into the void 37 of the seatback 36 of the vehicle 10. Furthermore, the present disclosure anticipates that the far-side inflatable airbag assembly 100 may be installed to the vehicle 10 during or after manufacture of the vehicle 10. The void 37 in the seatback 36 is adjacent a support structure of the seatback 36 and disposed inboard (toward the far-side door 20). The far-side inflatable airbag assembly 100 may be secured to the support structure to be disposed within the void 37.

FIG. 2A is a side view of a portion of the vehicle 10 having the far-side inflatable airbag assembly 100 of FIG. 1, with the far-side inflatable airbag assembly 100 at least partially deployed. The dash 12, the windshield 14, and the roof 16 are shown for reference, as are the vehicle occupant position 30 and the seatback 36. The far-side inflatable airbag assembly 100 comprises a housing 102, an inflator 104, and an inflatable airbag cushion 110. The inflatable airbag cushion 110 comprises an inflation throat 112, a main cushion 120, a pillow cushion 130, and a sail panel 140. The inflation throat 112 comprises a tube or channel connecting the inflatable airbag cushion 110 to the inflator 104. The inflation throat 112 is configured to direct inflation gas from the inflator 104 into a void defined by the main cushion 120. The pillow cushion 130 also defines a void to receive inflation gas. In other words, the main cushion 120 and the pillow cushion 130, in a deployed state, each defines a void to receive inflation gas, and the sail panel 140 remains uninflated.

In the context of FIG. 2A, one or more sensors (not shown) have identified or otherwise detected a collision event that may be characterized as a far-side collision event, or a far-side oblique collision event, for the vehicle occupant position 30. The one or more sensors accordingly have triggered deployment of the far-side inflatable airbag assembly 100. Deployment of the far-side inflatable airbag assembly 100 involves activation of the inflator 104, opening of the housing 102, and expansion and disposition of the inflatable airbag cushion 110 adjacent to and inboard of the occupant 50 (between the occupant 50 and the far-side door 20). Initial inflation of the inflatable airbag cushion 110 may force open a closure (not shown) of the housing 102.

The inflatable airbag cushion 110 is inflated by introduction 106 of inflation gas from the inflator 104 through the inflation throat 112 into the main cushion 120. As the inflatable airbag cushion 110 begins to inflate, it deploys in a forward direction from the void (see the void 37 in FIG. 1) at an inboard side portion of the seatback 36 to be positioned adjacent the vehicle occupant position 30 and, more particularly, adjacent the occupant 50. An upper portion of the pillow cushion 130 is coupled to an upper portion of the main cushion 120. As the main cushion 120 inflates, inflation gas from within the void of the main cushion 120 may be introduced 108 from the main cushion 120 into the pillow cushion 130. A first end of the sail panel 140 is coupled to a lower portion of the main cushion 120, and a second end of the sail panel 140 is coupled to a lower portion of the pillow cushion 130. The pillow cushion 130 and the sail panel 140, during deployment, may also deploy in a lateral direction. As the main cushion 120 and the pillow cushion 130 inflate and expand, the sail panel 140 is drawn taught. In an inflated state, the main cushion 120, the pillow cushion 130, and the sail panel 140 form a shape that may be characterized as roughly triangular or doughnut-like (hereafter, "triangular shape"). The main cushion 120, the pillow cushion 130, and the sail panel 140, in a deployed state, form the triangular shape in a plane transverse to a longitudinal midline of the vehicle 10. As will be described more fully, the triangular shape enables the main cushion 120, the pillow cushion 130, and the sail panel 140 to mutually support each other and provide resistance to lateral deflection of the inflatable airbag cushion 110.

FIG. 2B is a side view of a portion of the interior of the vehicle 10 having the far-side inflatable airbag assembly 100 of FIGS. 1 and 2A, with the inflatable airbag cushion 110 in a deployed state (e.g., a substantially inflated state). In a deployed state, the triangular shape of the inflatable airbag cushion 110 extends over the far-side shoulder 55 (relative to the perspective of a viewer of FIGS. 2A and 2B). In other words, the inflatable airbag cushion 110 may deploy forward into the shoulder portion 38 of the vehicle occupant position 30 that is disposed in the direction of a far-side collision event. A first apex 172 of the triangular shape is oriented toward the roof 16, a second apex 174 is oriented downward, and a third apex 176 of the triangular shape is disposed over the far-side shoulder 55 and toward the occupant 50. The first apex 172 is formed at a conjunction of the main cushion 120 and the pillow cushion 130. The second apex 174 is formed at a conjunction of the main cushion 120 and the sail panel 140. The third apex 176 is formed at a conjunction of the pillow cushion 130 and the sail panel 140. The sail panel 140 may engage the far-side shoulder 55 of the occupant 50. The pillow cushion 130 and the sail panel 140 are configured to extend, in the deployed state, from the main cushion 120 in a direction laterally away from the main cushion 120. In other words, the apex 176, in a deployed state, extends laterally away from the main cushion 120 and toward the occupant seating position 30. The pillow cushion 130 may be configured to receive and support the head 52 of the occupant 50.

The triangular shape of the inflatable airbag cushion 110 enables the main cushion 120, the pillow cushion 130, and the sail panel 140 to mutually support one another. Furthermore, the triangular shape of the inflatable airbag cushion 110 provides a substantial degree of resistance to deflection. The pillow cushion 130 and the sail panel 140 allow, with a relatively small volume of inflation gas, a lateral width of the cushion that can limit deflection and also receive the shoulder 55 and the head 52 of the occupant 50 early on to limit lateral movement of the occupant 50. In other words, the triangular shape of the inflatable airbag cushion 110, in a deployed state, may resist deflecting in a direction generally toward the far side of the vehicle 10, including oblique deflection. The degree of resistance to deflection is a function of a lateral width (or effective lateral width) of the inflatable airbag cushion 110. The greater the effective lateral width of the inflatable airbag cushion 110, the harder it is to bend in that lateral direction. In other words, the main cushion 120 and pillow cushion 130 in combination (and as configured by the sail panel) 140 may achieve a lateral width (with respect to a longitudinal axis of the vehicle 10; see e.g., the longitudinal axis 45 in FIG. 6) that provides significant support of the occupant 50 during or immediately following a collision event. With respect to relative timing between a collision event, translation of vehicle moment resulting from a collision event, and relative translation of moment of the occupant 50 within the vehicle 10, the occupant 50 may receive support of the inflatable airbag cushion 110 before achieving a significant velocity relative to the vehicle 10 (or vehicle moment translation). A lower relative velocity of the occupant 50 with respect to the vehicle 10 may enable the inflatable airbag cushion 110 to more effectively retain the occupant 50 within the vehicle occupant position 30. Furthermore, a lower relative velocity of the occupant 50 with respect to the vehicle 10 may prevent or mitigate injury to the occupant 50 resulting from the occupant 50 impacting upon internal structures of the vehicle 10.

The triangular shape of the inflatable airbag cushion 110 in a deployed state allows the pillow cushion 130 to receive and support the head 52 of the occupant 50 while the head 52 and, more particularly, a neck 53 of the occupant 50 are generally aligned with the torso 56 of the occupant 50. The triangular shape of the inflatable airbag cushion 110 may allow the sail panel 140 to receive and support the far-side shoulder 55 of the occupant 50 in conjunction with the pillow cushion 130 engaging and supporting the head 52 and the neck 53 of the occupant 50. The pillow cushion 130, sail panel 140, and main cushion 120 form a triangular shape configured to engage the occupant 50 earlier in a collision event and thereby reduce lateral movement of the occupant 50. Moreover, this earlier engagement can be accomplished by the pillow cushion 130 and sail panel 140 without a large volume inflation gas requirement. Supporting the far-side shoulder 55 of the occupant 50 produces inherent support of the torso 56 of the occupant 50; thus, in a deployed state, the sail panel 140 is configured to limit lateral displacement of the torso 56 of the occupant 50 of the vehicle occupant position 30. This conjunctive support of the head 52, the neck 53, and the torso 56 may serve to generally keep a spinal column 57 of the occupant 50 aligned, which, in turn may reduce a likelihood of injury, or degree of injury, to each of the head 52, the neck 53, the far-side shoulder 55, the torso 56, and the spinal column 57 of the occupant 50. The apices 172, 174, 176 may permit a degree of articulation of each of the main cushion 120, the pillow cushion 130, and the sail panel 140 while also conveying mutual support between each of these and affording a degree of resistance to deflection of the inflatable airbag cushion 110 away from the occupant 50.

Figure 3:
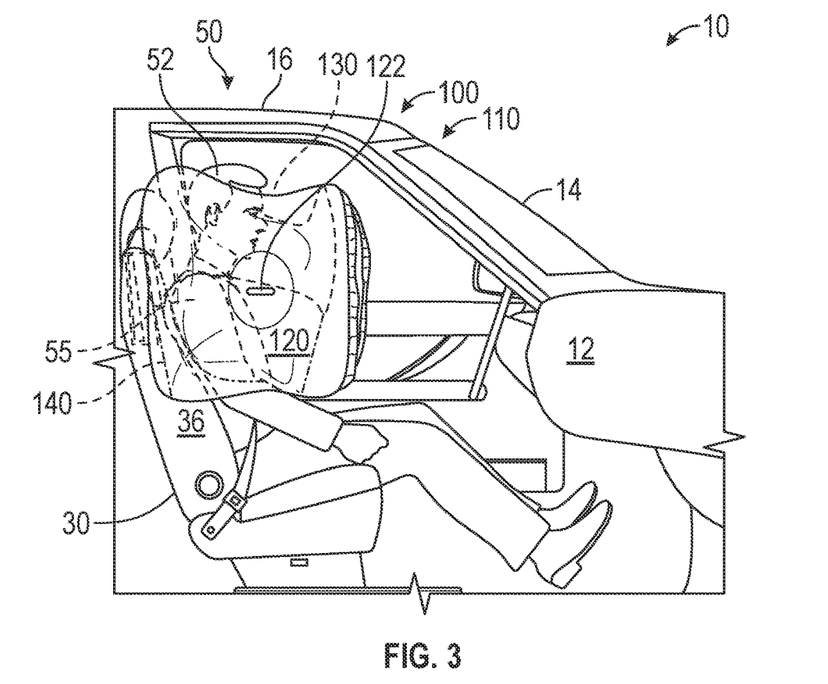
FIG. 3 is an opposite side view of the portion of the interior of the vehicle having the far-side inflatable airbag assembly of FIGS. 1-2B, with the inflatable airbag cushion in a substantially deployed state, according to an embodiment of the present disclosure.

FIG. 3 is an opposite side view of the portion of the interior of the vehicle 10 having the far-side inflatable airbag assembly 100 of FIGS. 1 and 2A-2B, with the inflatable airbag cushion 110 in a substantially deployed state. The dash 12, the windshield 14, the roof 16, and a near-side door 22 of the vehicle 10 are shown for reference, as are the vehicle occupant position 30 and the seatback 36. The head 52 and the far-side shoulder 55 (in this view, nearer the viewing plane) of the occupant 50 are shown for reference. The main cushion 120 of the inflatable airbag cushion 110 has a generally vertical disposition. The pillow cushion 130 and the sail panel 140 are configured to deploy in a direction laterally away from the main cushion 120. The pillow cushion 130 is disposed toward the occupant 50 and, more particularly, toward the head 52 of the occupant 50 and at least partially over the far-side shoulder 55. The sail panel 140 is disposed toward the occupant 50 and may be engaged against the far-side shoulder 55 of the occupant 50.

The main cushion 120 is configured with a first coupling 122 (e.g., a tether, or a zero-length tether or other uninflated area). The first coupling 122 couples between two panels (see the first and second panels 150, 152 in FIG. 5) of the inflatable airbag cushion 110 to reduce a volume of the void defined by the main cushion 120. The first coupling 122 may also add a degree of structural support to the main cushion 120, and hence to the inflatable airbag cushion 110. In other words, the first coupling 122 may limit a degree of deformation to which the main cushion 120 may be susceptible by creating an anchor point near a center of the main cushion 120 relative to a perimeter of the main cushion 120. Furthermore, by reducing the volume of the void defined by the main cushion 120, the first coupling 122 may reduce a total volume of inflation gas required to inflate the inflatable airbag cushion 110, which may result in a reduction in timing between initiation of deployment and achievement of substantial deployment. A reduction in total volume of inflation gas required to inflate the inflatable airbag cushion 110 may permit use of a smaller inflator 104, resulting in a more compact far-side inflatable airbag assembly 100.

Figure 4:
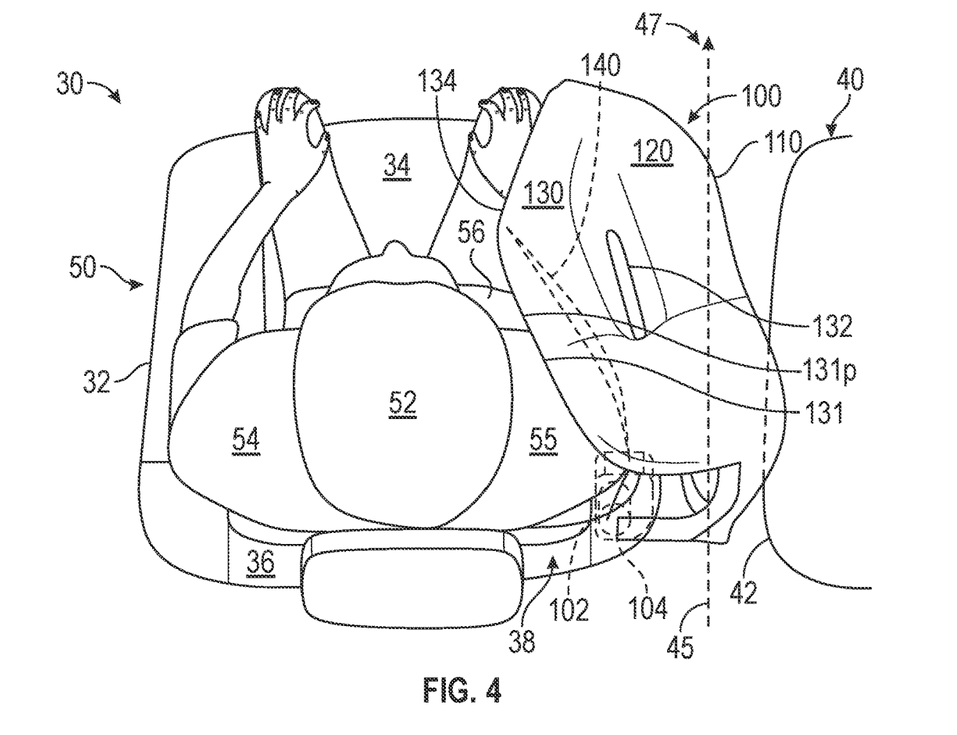
FIG. 4. is a plan view of the vehicle occupant position of the vehicle having the far-side inflatable airbag assembly of FIGS. 1-3, with the inflatable airbag cushion in a deployed state, according to an embodiment of the present disclosure.

FIG. 4. is a plan view of the vehicle occupant position 30 of the vehicle 10 having the far-side inflatable airbag assembly 100 of FIGS. 1-3, with the inflatable airbag cushion 110 in a deployed state. A logical midline 45 of the vehicle (see the vehicle in FIGS. 1-3) with a vehicle forward direction 47 indicated. The inflatable airbag cushion 110 is substantially inflated. For the present example, and not by way of limitation, the occupant 50 is seated in an upright posture on the seat base 34 and against the seatback 36. The main cushion 120 is disposed generally vertically and inboard of the occupant 50. A rear aspect of the main cushion 120 may extend generally upward and forward from the inflator 104, with a forward aspect of the main cushion 120 angled somewhat toward the vehicle occupant position 30. In other words, the inflatable airbag cushion 110 may first deploy from the seat back 36 in an upward direction then forward to dispose a portion of the main cushion 120 over the far-side shoulder 55 of the occupant 50 and into (or over) the shoulder portion 38 of the vehicle occupant position 30. The pillow cushion 130 is disposed toward the occupant 50. More particularly, the pillow cushion 130 may extend transversely (relative to and, in at least some embodiments, away from the vehicle logical midline 45) to be disposed at least partially over or in the shoulder portion 38 of the vehicle occupant position 30. The pillow cushion 130 has a second coupling 132. The second coupling 132 couples between two panels (see the first and second panels 150, 152 in FIG. 5) of the inflatable airbag cushion 110. The second coupling 132 reduces a total volume of inflation gas required to inflate the inflatable airbag cushion 110. The second coupling 132 also configures the inflatable airbag cushion 110 to form the first apex (see the first apex 172 in FIG. 2B) to dispose the pillow cushion 130 toward the head 52 of the occupant 50 and the third apex (see the third apex 176 in FIG. 2B) over the far-side shoulder 55 of the occupant 50. The second coupling 132 further configures the inflatable airbag cushion 110 to direct inflation gas from the main cushion 120 to the pillow cushion 130. (FIG. 2A described above illustrates inflation gas being introduced 108 from the main cushion 120 into the pillow cushion 130.)

The pillow cushion 130 of FIG. 4 has a panel 131 disposed toward the vehicle occupant position 30, the panel 131 having a curved profile, which curves disposed toward the occupant 50 at a forward end. The curved profile is configured to receive the head 52 of the occupant 50 to prevent or reduce injury to the head 52 by limiting one or more of forward movement of the head 52, lateral movement of the head 52, oblique movement of the head 52, and rotation of the head 52.

The main cushion 120 and the pillow cushion 130 form the first apex 172 of the triangular shape at a second coupling 132. A lower aspect of the main cushion 120 couples to a lower aspect of the sail panel 140 to form the second apex 174. A lower aspect of the pillow cushion 130 couples to an upper aspect of the sail panel 140 to form the third apex 176. The sail panel 140 is configured to engage the far-side shoulder 55 of the occupant 50. The sail panel 140 and the pillow cushion 130 (e.g., the panel 131 having the curved profile) engage, respectively, the far-side shoulder 55 and the head 52 of the occupant 50 to support the head 52, the far-side shoulder 55, the torso 56, and the neck 53 of the occupant 50 during a far-side collision event or a far-side oblique collision event. The inflatable airbag cushion 110 thus configured may prevent or reduce a degree of injury to the occupant 50 in a far-side collision event or a far-side oblique collision event. More particularly, in the illustration of FIG. 4, a far-side collision event or a far-side oblique collision event would occur to the reader's right, with the energies of the collision tending to push the vehicle occupant position 30 toward the left, resulting in a tendency of the occupant 50 to be displaced in a rightward relative direction. With deployment of an embodiment of the inflatable airbag cushion 110, the occupant 50 may be effectively retained at the vehicle occupant position 30 with relatively gradual dissipation of the energies tending to displace the occupant 50 in a right or right-lateral direction. Furthermore, in the present embodiment, a second vehicle occupant position 40 in many aspects similar to the vehicle occupant position 30 may be disposed to the immediate right of the vehicle occupant position 30. The inflatable airbag cushion 110 may prevent a tendency of the collision energies to displace the occupant 50 into, onto, or past an adjacent vehicle occupant position 40. If the adjacent vehicle occupant position is also occupied, the inflatable airbag cushion 110 may protect the occupant of the adjacent vehicle occupant position and the occupant 50 of the vehicle occupant position 30 from injuries that otherwise may result from occupant-to-occupant intravehicle collision.

In an embodiment of the present invention having three or more vehicle occupant positions 30, 40, etc. abreast, each seat 32, 42, etc., may be equipped with a far-side inflatable airbag assembly 100 at either side of each seat disposed adjacent another seat. Each far-side inflatable airbag assembly 100 may be configured to deploy only when the particular vehicle occupant position 30, 40, etc., is occupied, and only when the particular far-side inflatable airbag assembly 100 is deployable between the respective occupied vehicle occupant position 30, 40, etc., and a far-side collision event. In other words, in a right-side collision event, for example, only a right-side-disposed far-side inflatable airbag assembly 100 mounted at an occupied vehicle occupant position 30, 40, etc., may deploy, and a left-side-disposed far-side inflatable airbag assembly 100 may remain undeployed.

Figure 5:
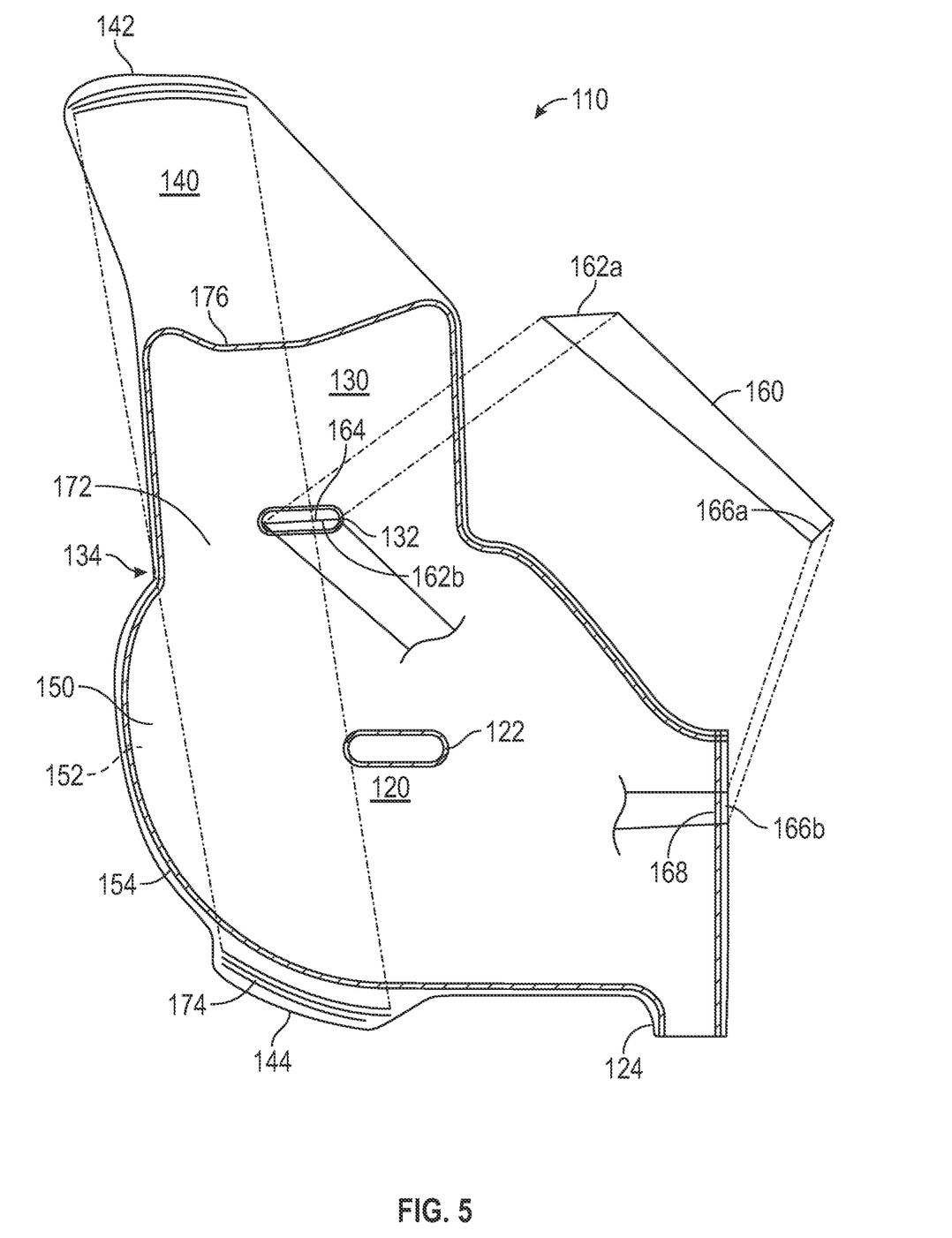
FIG. 5 is a plan view of the inflatable airbag cushion of the inflatable airbag assembly of FIGS. 1-4, in a preinstallation state, according to an embodiment of the present disclosure.

FIG. 5 is a plan view of the inflatable airbag cushion 110 of the inflatable airbag assembly 100 of FIGS. 1-4 in a preinstallation state. The inflatable airbag cushion 110 comprises a first panel 150 and a second panel 152, with the first panel 150, in the present view, overlying the second panel 152. The first panel 150 and the second panel 152 are coupled together at a perimeter coupling 154. The first panel 150 comprises at least a first side of the main cushion 120 and the pillow cushion 130. The second panel 152 comprises at least a second side of the main cushion 120 and the pillow cushion 130. In one embodiment, the first panel 150 may further comprise the sail panel 140. In one embodiment, the second panel 152 may further comprise the sail panel 140.

The perimeter coupling 154, in the present embodiment, circumscribes and couples together a portion of the inflatable airbag cushion 110 defining a perimeter of the main cushion 120 and the pillow cushion 130, and defining the voids of the main cushion 120 and the pillow cushion 130 to receive inflation gas. The first panel 150 and the second panel 152 are further coupled together at the first coupling 122 and at the second coupling 132. The first and second couplings 122, 132 reduce a total volume of inflation gas needed to inflate the inflatable airbag cushion 110. The first and second couplings 122, 132 may provide structural support to the main cushion 120 and the pillow cushion 130 in a deployed state.

The inflatable airbag cushion 110 comprises a sail panel first tab 142 and a sail panel second tab 144. During assembly of the inflatable airbag cushion 110, the first tab 142 and the second tab 144 are coupled together. Coupling together the first tab 142 and the second tab 144 configures the inflatable airbag cushion 110 to form the roughly triangular or doughnut-like shape when deployed during a collision event. The second coupling 132 assists in disposing the pillow cushion 130 laterally toward the occupant (see the occupant 50 in FIGS. 2A-4) and forming the first apex 172. The coupling of the first and second tabs 142, 144 forms the second apex 174. The coupling together of the first and second tabs 142, 144 is illustrated by a pair of dash-dot lines drawn between the first and second tabs 142, 144. A portion of the perimeter coupling 154 enables the inflatable airbag cushion 110 to form the third apex 176.

The perimeter coupling 154 excludes a portion of the first and second panels 150, 152 to form the inflation throat 112. The inflation throat 112 may be coupled to the inflator (see the inflator 104 in FIG. 2A). The perimeter coupling 154, the first coupling 122, the second coupling 132, and the coupling of the first and second tabs 142, 144 may be accomplished by one or more of sewing, radio frequency welding, adhesive, or any other appropriate means.

The inflatable airbag cushion 110 further comprises a tether 160. The tether 160 has a first end 162*a* and a second end 166*a*. During assembly of the inflatable airbag cushion 110, the first end 162*a* of the tether 160 may be coupled 164 near or at the second coupling 132 of the inflatable airbag cushion 110. A first end 162*b* is shown coupled at the second coupling 132, for reference. The second end 166*a* of the tether 160 may be coupled at a portion 168 of the perimeter coupling 154. For reference, a second end 166*b* is shown coupled at the portion 168 of the perimeter coupling 154. The tether 160 may assist in disposing the inflatable airbag cushion 110 as described at FIGS. 2A-4.

Figure 6:
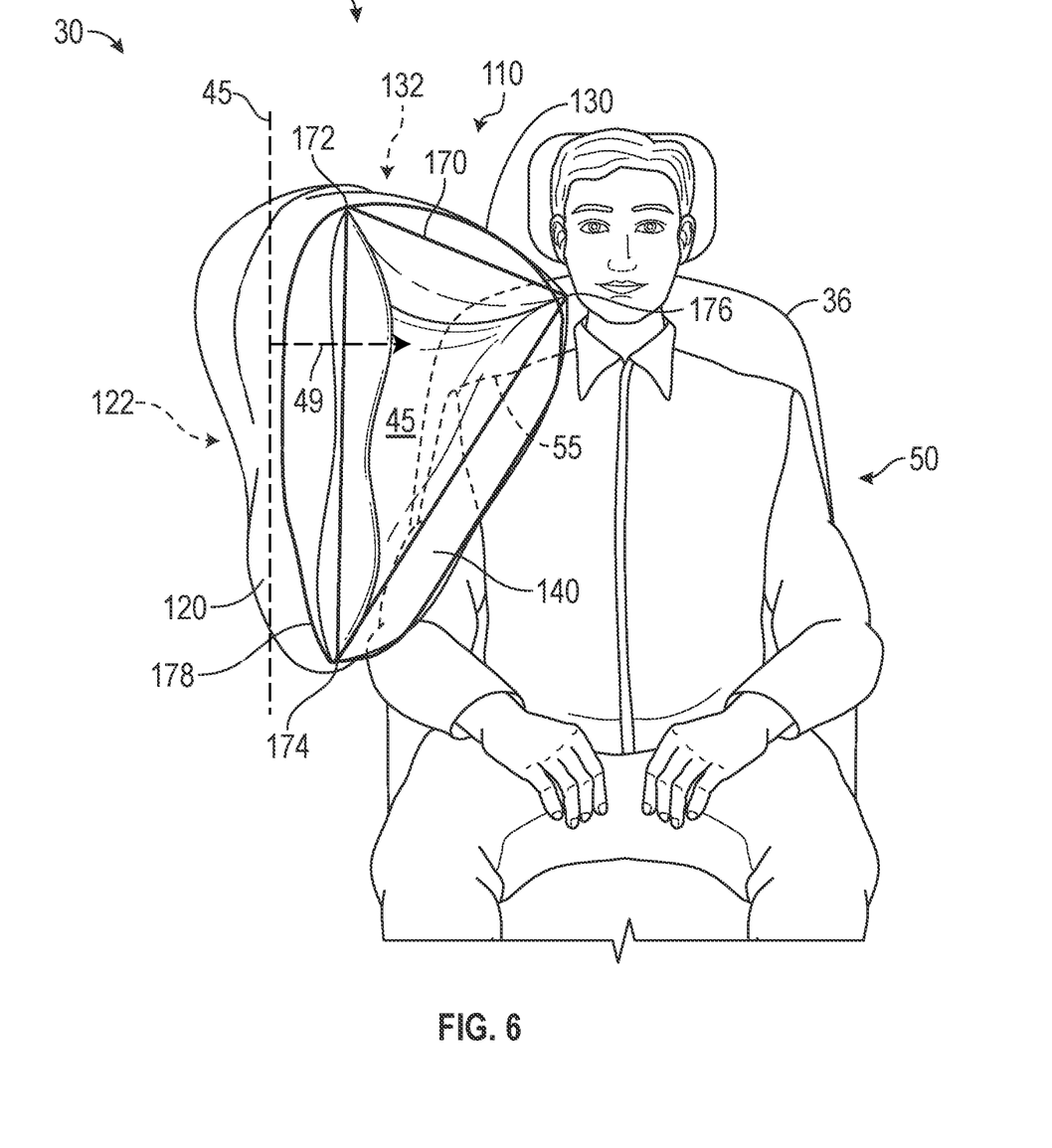
FIG. 6 is a front view of the inflatable airbag cushion of the far-side inflatable airbag assembly of FIGS. 1-5 in a deployed state receiving an occupant seated in a vehicle occupant position.

FIG. 6 is a front view of the inflatable airbag cushion 110 of the far-side inflatable airbag assembly 100 of FIGS. 1-5 in a deployed state and receiving an occupant 50 seated in the vehicle occupant position 30. The inflatable airbag cushion 110 is shown substantially inflated. The main cushion 120, the pillow cushion 130, and the sail panel 140 are shown, as are the first and second couplings 122, 132. A seat back 36 of the vehicle occupant position 30 is also shown for reference. An occupant 50 is shown seated at the vehicle occupant position 30. The sail panel 140 has engaged or received the far-side shoulder 55 of the occupant 50.

The vehicle logical midline 45 is shown, for ease of reference, as a vertical plane in line with a front-to-rear axis of the vehicle. The inflatable airbag cushion 110 deploys in a direction transverse 49 to the vehicle logical midline 45. The roughly triangular shape 170 formed by the deployed inflatable airbag cushion 110 is shown, as are the first, second and third apices 172, 174, 176 of the roughly triangular shape 170. The illustrated triangular shape 170 is a generalization and not intended to depict an exact form of the inflatable airbag cushion 110. For example, the apices 172, 174, 176 may, in some embodiments be more rounded that in the embodiment of the inflatable airbag cushion 110 shown in FIG. 6; hence, the shape may be roughly doughnut-like 178. Furthermore, in some embodiments, the particular orientation of the roughly triangular shape 170 and the disposition of the apices 172, 174, 176 may vary.

Throughout this specification, the phrase "coupled to" refers to any form of interaction between two or more entities, including mechanical, electrical, magnetic, electromagnetic, fluid, and thermal interaction. Two components may be coupled to each other even though they are not in direct contact with each other.

The terms "a" and "an" can be described as one, but not limited to one. For example, although the disclosure may recite a tab having "a line of stitches," the disclosure also contemplates that the tab can have two or more lines of stitches.

Unless otherwise stated, all ranges include both endpoints and all numbers between the endpoints.

The "vehicle occupant position" refers to a position in which an occupant is generally positioned when seated in a seat of a vehicle or typically expected to be positioned during vehicle operation. The term "occupant" refers to a person or crash test dummy within a vehicle.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 ¶ 6. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag system comprising:
   an inflator; and
   an inflatable airbag cushion configured to be mounted at a side portion of a seat of a vehicle and to deploy in a forward direction from the side portion of the seat to be positioned adjacent a vehicle occupant position defined by the seat, the inflatable airbag cushion comprising:
      a main cushion coupled to the inflator, the main cushion to deploy forward from the portion of the seat;
      a pillow cushion coupled at an upper portion to an upper portion of the main cushion, the pillow cushion to be disposed on an occupant side of the main cushion to be positioned between the main cushion and the vehicle occupant position, wherein the pillow cushion extends downwards from an apex of the main cushion; and
      a sail panel coupled at a first end to a lower portion of the main cushion, and at a second end to a lower portion of the pillow cushion,
   wherein, in a deployed state, the main cushion, the pillow cushion, and the sail panel form a shape that is one of roughly triangular and roughly doughnut-like, the shape extending over a shoulder of an occupant.

2. The inflatable airbag system of claim 1, wherein the main cushion and the pillow cushion, in a deployed state, each defines a void to receive inflation gas and the sail panel remains uninflated.

3. The inflatable airbag system of claim 1, wherein the side portion of the seat is an inboard portion disposed toward a longitudinal centerline of the vehicle and a distance from a laterally adjacent seat of the vehicle to limit inboard lateral displacement of at least a portion of an occupant of the vehicle occupant position during a far-side collision event.

4. The inflatable airbag system of claim 1, wherein a void defined by the pillow cushion is in fluid communication with a void defined by the main cushion to receive inflation gas from the main cushion.

5. The inflatable airbag system of claim 1, wherein the pillow cushion and the sail panel, in a deployed state, are configured to extend from the main cushion in a direction laterally away from the main cushion and over a shoulder portion of the vehicle occupant position to be positioned to cushion and provide lateral support for a head of an occupant of the vehicle occupant position during a collision event.

6. The inflatable airbag system of claim 1, wherein, in a deployed state, the sail panel is configured to engage a shoulder of an occupant of the vehicle occupant position.

7. The inflatable airbag system of claim 1, wherein the main cushion, the pillow cushion, and the sail panel mutually support each other by virtue of the shape they form to provide resistance to deflection of the inflatable airbag cushion.

8. The inflatable airbag system of claim 1, wherein, in a deployed state, the pillow cushion receives structural support from the main cushion.

9. The inflatable airbag system of claim 1, wherein, in a deployed state, the sail panel is positioned adjacent the vehicle occupant position to limit lateral displacement of a shoulder of an occupant of the vehicle occupant position.

10. The inflatable airbag system of claim 1, wherein, in a deployed state, the pillow cushion is configured to limit lateral displacement of a head of an occupant of the vehicle occupant position.

11. The inflatable airbag system of claim 1, wherein, in a deployed state, the pillow cushion comprises a panel disposed toward the vehicle occupant position, the panel having a curved profile configured to limit forward movement of a head of an occupant of the vehicle occupant position.

12. An inflatable airbag system to be mounted at a side of a seat of a vehicle, the inflatable airbag system comprising:
   an inflator; and
   an inflatable airbag cushion comprising a main cushion, a pillow cushion coupled at an upper portion to an upper portion of the main cushion to be disposed on an occupant side of the main cushion, and a sail panel having a lower portion coupled to a lower portion of the main cushion and an upper portion coupled to a lower portion of the pillow cushion,
   wherein the main cushion, the pillow cushion, and the sail panel, in a deployed state, form a triangular shape in a plane transverse to a longitudinal midline of the vehicle, the triangular shape causing the main cushion, the pillow cushion, and the sail panel to mutually support each other and provide resistance to lateral deflection of the inflatable airbag cushion, and
   wherein the inflatable airbag cushion is configured to initially deploy in a forward direction over a shoulder area of a vehicle occupant position defined by the seat from a lateral portion of a seatback of the seat of the vehicle.

13. The inflatable airbag cushion of claim 12, wherein the main cushion and the pillow cushion each define a void configured to receive inflation gas.

14. The inflatable airbag cushion of claim 13, wherein the void of the pillow cushion is in fluid communication with and configured to receive inflation gas from the void of the main cushion.

15. The inflatable airbag system of claim 12, wherein the pillow cushion and the sail panel deploy in a lateral direction.

16. The inflatable airbag system of claim 12, wherein, in a deployed state, the main cushion, the pillow cushion, and the sail panel provide structural support for each other.

17. The inflatable airbag system of claim 12, wherein the shape formed by coupling the main cushion, the pillow cushion, and the sail panel extends over a shoulder of an occupant of the seat of the vehicle, the shape configuring the pillow cushion to receive and support a head of the occupant, and further configuring the sail panel to receive the shoulder of the occupant.

18. The inflatable airbag system of claim 12, wherein, in a deployed state during one of a far-side collision event and a far-side oblique collision event, the pillow cushion is configured to limit lateral movement of a head of the occupant, and the sail panel is configured to limit movement of a torso of the occupant.

19. The inflatable airbag system of claim 12, wherein, in a deployed state, the pillow cushion comprises a panel disposed toward a head of the occupant of the seat, the panel having a curved profile configured to limit forward movement of the head of the occupant.

* * * * *